US011153827B2

(12) United States Patent
Takeda et al.

(10) Patent No.: US 11,153,827 B2
(45) Date of Patent: Oct. 19, 2021

(54) USER TERMINAL AND RADIO COMMUNICATION METHOD

(71) Applicant: NTT DOCOMO, INC., Tokyo (JP)

(72) Inventors: Kazuaki Takeda, Tokyo (JP); Kazuki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/346,737

(22) PCT Filed: Nov. 1, 2017

(86) PCT No.: PCT/JP2017/039620
§ 371 (c)(1),
(2) Date: May 1, 2019

(87) PCT Pub. No.: WO2018/084205
PCT Pub. Date: May 11, 2018

(65) Prior Publication Data
US 2020/0059866 A1 Feb. 20, 2020

(30) Foreign Application Priority Data
Nov. 2, 2016 (JP) .............................. JP2016-215714

(51) Int. Cl.
*H04W 72/04* (2009.01)
*H04W 52/14* (2009.01)
(Continued)

(52) U.S. Cl.
CPC ......... *H04W 52/146* (2013.01); *H04L 5/0048* (2013.01); *H04W 16/28* (2013.01); *H04W 72/042* (2013.01); *H04W 72/046* (2013.01)

(58) Field of Classification Search
CPC . H04W 52/146; H04W 72/042; H04W 72/04; H04W 16/28; H04W 4/06; H04W 28/18; H04W 56/001; H04L 5/0048
See application file for complete search history.

(56) References Cited

U.S. PATENT DOCUMENTS

| 2016/0135131 A1* | 5/2016 | Shin ..................... H04W 52/06 455/522 |
| 2018/0049204 A1* | 2/2018 | Nory ..................... H04W 48/12 |
| 2019/0159138 A1* | 5/2019 | Lee ..................... H04W 52/146 |

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

(Continued)

Primary Examiner — Jamal Javaid
(74) Attorney, Agent, or Firm — Osha Bergman Watanabe & Burton LLP

(57) ABSTRACT

Transmission power is appropriately controlled for various techniques to be introduced for radio communication. A user terminal includes: a transmission section that transmits an uplink signal; and a control section that controls transmission power of the uplink signal based on at least one of received power of a user terminal specific reference signal to which downlink beam forming has been applied and/or received power of a reference signal associated with the downlink beam forming, and a Transmission Power Control (TPC) command included in downlink control information.

4 Claims, 13 Drawing Sheets

(51) Int. Cl.
H04L 5/00 (2006.01)
H04W 16/28 (2009.01)

(56) References Cited

OTHER PUBLICATIONS

Nokia, Alcatel-Lucent Shanghai Bell; "Power Control for MIMO"; 3GPP TSG-RAN WG1 Meeting #86bis R1-1610283; Lisbon, Portugal, Oct. 10-14, 2016 (4 pages).
Huawei, HiSilicon; "UL power control for NR MIMO"; 3GPP TSG RAN WG1 Meeting #86bis R1-1608821; Lisbon, Portugal, Oct. 10-14, 2016 (4 pages).
International Search Report issued for PCT/JP2017/039620, dated Jan. 23, 2018 (7 pages).
Written Opinion issued for PCT/JP20171039620, dated Jan. 23, 2018 (4 pages).

Office Action issued in the counterpart European Patent Application No. 17867168.1, dated May 8, 2020 (13 pages).
Intel Corporation; "Discussion on UL Power Control"; 3GPP TSG-RAN WG1 #86bis, R1-1609531; Lisbon, Portugal, Oct. 10-14, 2016 (5 pages).
3GPP TSG RAN WG1 Meeting #84bis; R1-162921 "NB-IoT—Remaining issues on UL power control" Ericsson; Busan, Korea; Apr. 11-15, 2016 (2 pages).
3GPP TSG RAN WG1 Meeting #84bis; R1-162631 "Uplink power control" Huawei, HiSilicon; Busan, Korea; Apr. 11-15, 2016 (4 pages).
3GPP TSG RAN WG1 NB-IoT Ad-Hoc Meeting #2; R1-162012 "WF on open loop power control" Huawei, HiSilion; Sophia-Antipolis, France; Mar. 22-24, 2016 (3 pages).
Extended European Search Report issued in European Application No. 17867168.1, dated Jul. 28, 2020 (14 pages).
Office Action issued in European Application No. 17867168.1, dated Mar. 26, 2021 (7 pages).

* cited by examiner

BEAM FORMING IS APPLIED

BEAM FORMING IS NOT APPLIED

FIG. 4A

| TCP command filed in DCI format | Accumulated $\delta_{PUSCH}$ dBM |
|---|---|
| '00' | -1 |
| '01' | 0 |
| '10' | 1 |
| '11' | 3 |

FIG. 4B

| TCP command filed in DCI format | Accumulated $\delta_{PUSCH}$ dBM |
|---|---|
| '00' | -3 |
| '01' | 0 |
| '10' | 3 |
| '11' | 6 |

Tx/Rx RECIPROCITY IS NOT APPLIED IN RADIO BASE STATION

Tx/Rx RECIPROCITY IS NOT APPLIED IN USER TERMINAL

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and low latency, Long Term Evolution (LTE) has been specified (Non-Patent Literature 1). Furthermore, for the purpose of wider bands and a higher speed than LTE (also referred to as LTE Rel. 8 or 9), LTE-Advanced (LTE-A that is also referred to as LTE Rel. 10, 11 or 12) has been specified, and successor systems of LTE (also referred to as, for example. Future Radio Access (FRA), the 5th generation mobile communication system (5G), New Radio (NR), New radio access (NX), Future generation radio access (FX) or LTE Rel. 13, 14, 15 or subsequent releases) have been also studied.

LTE Rel. 10/11 have introduced Carrier Aggregation (CA) that aggregates a plurality of carriers (Component Carriers (CCs) or cells) to obtain a wider band. A system band of LTE Rel. 8 is one unit that composes each component carrier. Furthermore, according to CA, a plurality of CCs of the same radio base station (eNB: eNodeB) is configured to a user terminal (UE: User Equipment).

Furthermore, LTE Rel. 12 has introduced Dual Connectivity (DC), too, that configures a plurality of Cell Groups (CGs) of different radio base stations to user terminals. Each cell group includes at least one carrier (a CC or a cell). DC aggregates a plurality of carriers of the different radio base stations and therefore is also referred to as Inter-base station CA (inter-eNB CA).

Furthermore, legacy LTE systems (e.g., LTE Rel. 8 to 13) perform communication on DownLink (DL) and/or UpLink (UL) by using Transmission Time Intervals (TTIs) of one ms. This TTI of one ms is a transmission time unit of one channel-coded data packet, and is a processing unit of scheduling, link adaptation and retransmission control (HARQ-ACK: Hybrid Automatic Repeat reQuest-Acknowledge). The TTI of one ms is also referred to as a subframe or a subframe length.

CITATION LIST

Patent Literature

Non-Patent Literature 1: 3GPP TS 36.300 Rel.8 "Evolved Universal Terrestrial Radio Access (E-UTRA) and Evolved Universal Terrestrial Radio Access Network (E-UTRAN); Overall description; Stage 2"

SUMMARY OF THE INVENTION

Technical Problem

Various techniques such as numerologies and beam forming are assumed to be introduced to the successor systems of LTE to meet requests for various types of communication. As these techniques are introduced, there is a risk that transmission power control used by legacy LTE cannot be used as is. Hence, it is demanded to appropriately control transmission power for the various techniques to be introduced.

The present invention has been made in light of this point, and one of objects of the present invention is to provide a user terminal and a radio communication method that can appropriately control transmission power for various techniques to be introduced for radio communication.

Solution to Problem

A user terminal according to one aspect includes: a transmission section that transmits an uplink signal; and a control section that controls transmission power of the uplink signal based on at least one of received power of a user terminal specific reference signal to which downlink beam forming has been applied and/or received power of a reference signal associated with the downlink beam forming, and a Transmission Power Control (TPC) command included in downlink control information.

A user terminal according to one aspect includes: a transmission section that transmits an uplink signal; and a control section that controls transmission power of the uplink signal based on bandwidth information related to a bandwidth to be allocated to the uplink signal, and the bandwidth information is an absolute value of the bandwidth to be allocated to the uplink signal, or a value computed based on a number of resource blocks to be allocated to the uplink signal, and a numerology.

Technical Advantage of the Invention

According to the present invention, it is possible to appropriately control transmission power for various techniques to be introduced for radio communication.

BRIEF DESCRIPTION OF THE DRAWINGS

FIGS. 4A and 4B are diagrams for explaining a correction value ($\delta_{PUSCH}$) matching a TPC command.

DESCRIPTION OF EMBODIMENTS

A future radio communication system (e.g., LTE Rel. 14 or 15, 5G or NR) is expected to realize various radio communication services while meeting respectively different request conditions (e.g., an ultra high speed, a large volume and ultra low latency).

For example, it is studied for 5G to provide radio communication service that is referred to as enhanced Mobile Broad Band (eMBB), Internet of Things (IoT), Machine Type Communication (MTC), Machine To Machine (M2M) and Ultra Reliable and Low Latency Communications (URLLC). In this regard, M2M may be referred to as Device To Device (D2D) or Vehicle to Vehicle (V2V) depending on devices to communicate with. To meet the request for the above various types of communication, it is studied to design a new communication access scheme (New Radio Access Technology (RAT)).

It is desired for NR to accommodate various services such as high speed and large volume communication (massive connection (mMTC: massive MTC) from a device (user terminal) for Machine to Machine (M2M) communication such as eMBB, IoT or MTC)), and low latency and ultra reliable communication (Ultra-Reliable and Low Latency Communication (URLLC)) in a single framework. URLLC is demanded to provide a higher latency reduction effect than those of eMBB and mMTC.

Furthermore, NR is assumed to support a wide frequency band including a high frequency. More specifically, the wide frequency band is a frequency band such as a contiguous 800 MHz bandwidth or a 2 GHz bandwidth in a frequency band equal to or more than 6 GHz. It is assumed that a plurality of operators or a single operator use such a wide frequency band.

To support the above various services, it is assumed to introduce one or more numerologies. The numerologies are a set of communication parameters (radio parameters) in frequency and/or time directions. These communication parameters include at least one of, for example, a subcarrier spacing, a bandwidth, a symbol length, a CP time duration (CP length), a subframe length, a TTI time duration (TTI length), the number of symbols per TTI, a radio frame configuration, filtering processing and windowing processing.

In addition, in legacy LTE systems, a user terminal performs communication on DL and/or UL by using the TTI having a time duration of one ms. This TTI may be also referred to as a normal TTI, a TTI, a subframe, a long TTI, a normal subframe, a long subframe, a legacy TTI or a scheduling unit, and may include two slots. Furthermore, each symbol in the normal TTI is added with a Cyclic Prefix (CP). When a normal CP (e.g., 4.76 µs) is added to each symbol, the normal TTI is configured to include 14 symbols (seven symbols per slot) (see FIG. 1). Furthermore, a TTI (e.g., a TTI less than one ms) shorter than those of the legacy LTE systems may be referred to as a shortened TTI or a short TTI.

Figure 1:
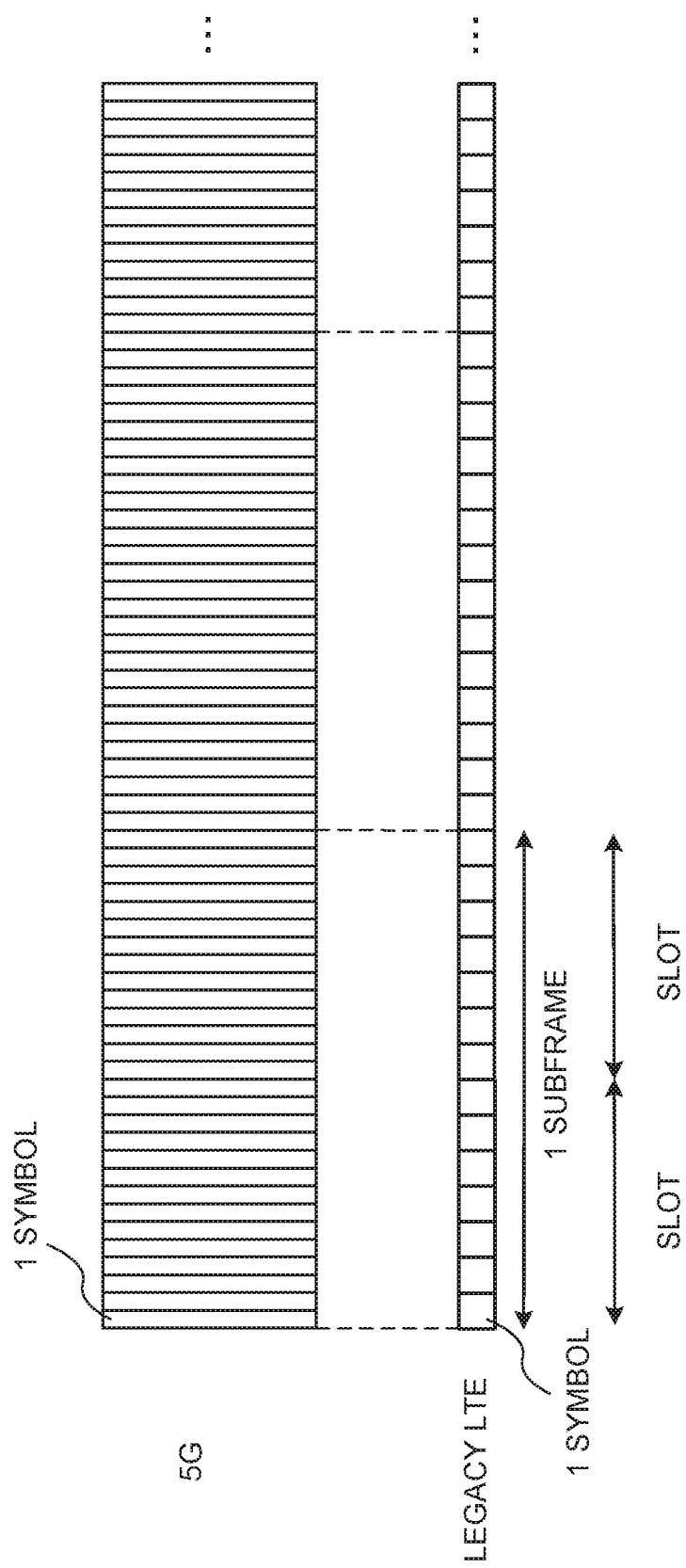
FIG. 1 is a diagram for explaining an increase in the number of symbols of one subframe caused by using a high frequency band.

When, for example, a subcarrier spacing is widened for multicarrier transmission such as OFDM as one of the numerologies, the symbol length becomes short (the symbol length and the subcarrier spacing have a relationship of reciprocals), and therefore it is considered to increase the number of symbols per subframe (see FIG. 1). Similarly, in a case of SC transmission (DFT-spread OFDM transmission), too, when a high frequency band is used to widen a band, the symbol length becomes short, and therefore it is considered to increase the number of symbols per subframe.

Figure 2A:
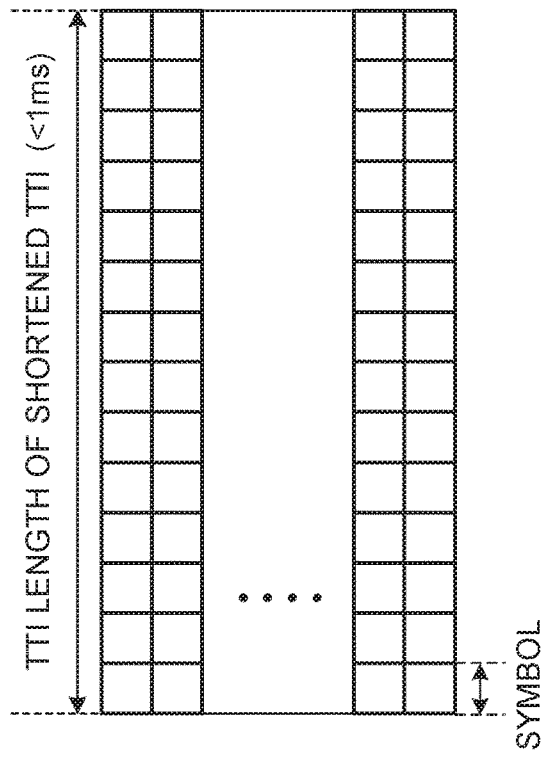
FIGS. 2A and 2B are diagrams illustrating a configuration example of a shortened TTI.
Figure 2B:
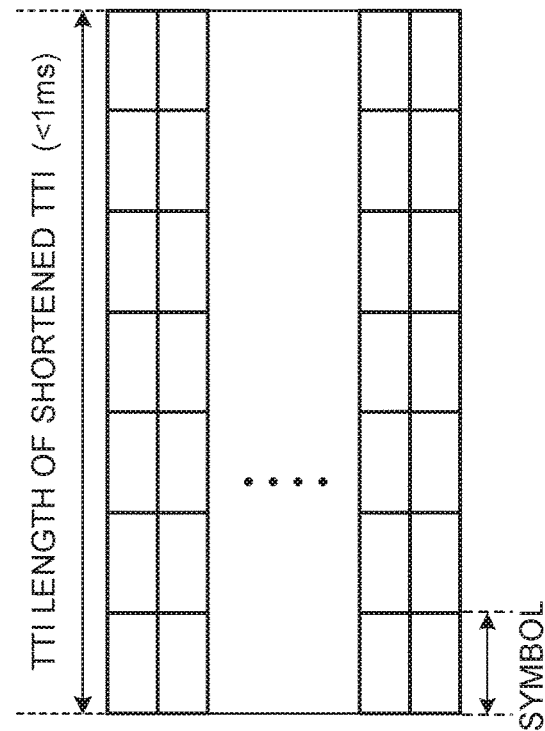

On the other hand, it is also considered to employ the shortened TTI, and adjust the number of symbols per scheduling unit to the existing number or less. FIG. 2A illustrates a configuration of 14 OFDM symbols (or SC-FDMA symbols) the number of which is the same as that of the general TTI, and each OFDM symbol (each SC-FDMA symbol) has a symbol length that is shorter than a symbol length (=66.7 µs) of the general TTI. FIG. 2B illustrates a configuration of OFDM symbols (or SC-FDMA symbols) the number of which is smaller than that of the general TTI, and each OFDM symbol (each SC-FDMA symbol) has a symbol length (=66.7 µs) that is the same as that of the general TTI.

Figure 3B:
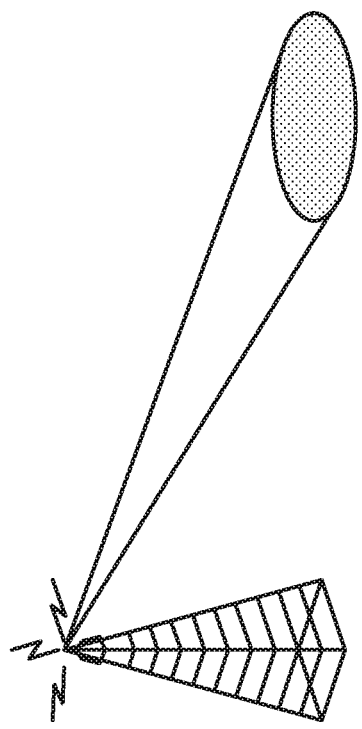
FIGS. 3A and 3B are diagrams for explaining coverages in cases where beam forming is applied and is not applied.
Figure 3A:
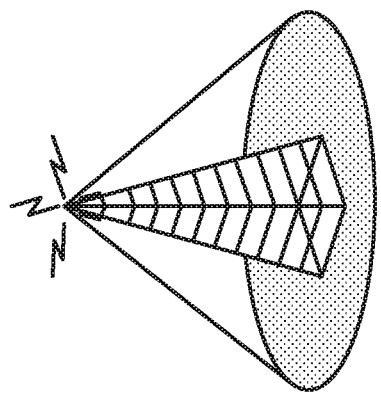

Furthermore, to support the above various services, it is also considered to expand a coverage by applying beam forming to a high frequency band. When, for example, beam forming is not applied as illustrated in FIG. 3A, a signal transmitted from a transmission point (a radio base station or a user terminal) is limited to a fixed coverage whose center is the transmission point. On the other hand, when beam forming is applied, a signal transmitted from the transmission point becomes a signal whose amplitude and/or phase are controlled and that has directionality. Hence, as illustrated in FIG. 3B, a region that is located far from the transmission point and is limited compared to a case where beam forming is not applied can be formed as a coverage.

However, as the above various techniques (the numerologies and beam forming) are introduced, there is a probability that legacy transmission power control cannot be used as is. When, for example, a subcarrier is 15 kHz, a bandwidth of one RB is 180 kHz. However, when this bandwidth is configured by two-fold numerologies, the bandwidth is 360 kHz, and transmission power control used by legacy LTE cannot be applied (or even when the transmission power control is applied, the number of PRBs allocated to a signal is not reflected in transmission power, and the transmission power cannot be appropriately controlled).

In view of such a situation, the inventors of the present invention have studied a transmission power control method that can optimally control transmission power for the various techniques to be introduced while utilizing legacy transmission power control, and have arrived at the present invention. More specifically, the inventors of the present invention have conceived an idea of using path-loss estimated by using a downlink UE specific reference signal to which downlink beam forming has been applied and/or a reference signal associated with a beam, or Reference Signal Received Power (RSRP), and/or determining a correction value indicated by a Transmission Power Control (TPC) command according to application of beam forming or a beam forming mode. Furthermore, the inventors of the present invention have conceived an idea of using for a bandwidth (the number of Physical Resource Blocks (PRBs)) used for transmission power control an absolute value of a bandwidth to be allocated to an uplink signal (e.g., a Physical Uplink Shared Channel (PUSCH), a Physical Uplink Control Channel (PUCCH) or a Sounding Reference Signal (SRS)), or a value computed based on the number of resource blocks and the numerologies.

(Radio Communication Method)
(First Aspect)

The first aspect of the radio communication method according to one embodiment of the present invention will be described below. This radio communication method controls transmission power of an uplink signal transmitted from a user terminal. In addition, the first aspect of the present embodiment will be described targeting at an uplink shared signal (PUSCH) as a transmission power control target uplink signal.

According to this radio communication method, transmission power $P_{PUSCH,c}(i)$ of the PUSCH in a subframe i of a cell c can be expressed by following equation (1). In addition, above equation (1) employs fractional Transmission Power Control (TPC) that increases a transmission power target value when path-loss is little (closer to a radio base station).

[Mathematical 1]

$$P_{PUSCH,c}(i) = \min \begin{cases} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases} [dBm]$$

(Equation 1)

In this regard, $P_{CMAX,c}(i)$ is maximum transmission power of the user terminal. $M_{PUSCH,c}(i)$ is a bandwidth (e.g., the number of resource blocks) for the PUSCH allocated to the user terminal according to legacy LTE. However, according to the radio communication method, $M_{PUSCH,c}(i)$ indicates an absolute value of a bandwidth to be allocated to an uplink signal.

More specifically, when one subcarrier spacing is 15 kHz, one PRB is allocated to a control target uplink signal and, furthermore, one PRB includes 12 subcarriers, 180 kHz (15 kHz×12) is $M_{PUSCH,c}(i)$. Furthermore, when one PRB includes 16 subcarriers under the above conditions, $M_{PUSCH,c}(i)$ is 240 kHz.

Furthermore, when two-fold numerologies are configured to a subcarrier spacing (one subcarrier spacing=30 kHz), one PRB is allocated to the transmission power control target uplink signal, and, when one PRB includes 12 subcarriers, $M_{PUSCH,c}(i)$ is 360 kHz (30 kHz×12).

Thus, according to this radio communication method, $M_{PUSCH,c}(i)$ indicates an absolute value of a bandwidth to be allocated to an uplink signal, so that transmission power control that uses $M_{PUSCH,c}(i)$ is power control that reflects the numerologies. The absolute value of the bandwidth may be notified to the user terminal as bandwidth information by higher layer signaling that uses at least one of an MIB, an SIB and RRC. Furthermore, the absolute value of the bandwidth may be dynamically notified by L1/L2 signaling.

$P_{O\_PUSCH,c}(j)$ is a parameter (e.g., a parameter related to a transmission power offset) (referred to as a target received power parameter below) related to target received power (target received SNR: Signal to Noise Ratio). "j" represents a parameter that specifies a UL grant type. $\alpha_c(j)$ is a weight coefficient of a fractional TPC.

$PL_c$ is path-loss (propagation loss). Legacy LTE is applied a value obtained by subtracting RSRP (higher layer filtered RSRP) from reference signal transmission power (reference Signal Power) notified from the radio base station. This radio communication method uses path-loss estimated based on a downlink UE specific reference signal to which beam forming has been applied and/or a reference signal associated (having an association) with a beam, or Reference Signal Received Power (RSRP) for transmission power control.

More specifically, $PL_c$ is found by using the downlink UE specific reference signal or the reference signal associated with a beam. When beam forming is applied, a value obtained by subtracting beam-formed reference signal received power (higher layer filtered and beam-formed RSRP) from reference signal transmission power is used as $PL_c$. Consequently, a gain of the beam forming is taken into account for path-loss to be computed.

$\Delta_{TF,c}(i)$ is an offset based on a modulation scheme and a code rate (MCS: Modulation and Coding Scheme) applied to a PUSCH.

$f_c(i)$ is a correction value of a TPC command. For this correction value, too, this radio communication method prepares a plurality of correction values (or a correction value set) by taking into account a case where beam forming is applied and a case where beam forming is not applied, and determines (switches) the correction value. More specifically, when beam forming is not applied, $f_c(i)$ is a correction value that conforms to a table (correction value set) illustrated in FIG. 4A, and, when beam forming is applied, $f_c(i)$ is a correction value that conforms to a table (correction value set) illustrated in FIG. 4B.

As described above, above equation (1) defines transmission power of the PUSCH in the subframe i of the cell c as maximum transmission power ($P_{CMAX,c}(i)$) or less of the user terminal. In a case of transmission power less than the maximum transmission power, the transmission power is defined based on $10 \log_{10}(M_{PUSCH,c}(i)) + P_{O\_PUSCH,c}(j) + \alpha_c(j) \cdot PL_c + \Delta_{TF,c}(i) + f_c(i)$ defined by the above parameters.

When, for example, a TPC command field of a DCI format is "00", $f_c(i)$ is "−1 dBm" in a case where beam forming is not applied, and $f_c(i)$ is "−3 dBm" in a case where beam forming is applied. When the TPC command field is "01", $f_c(i)$ is "0 dBm" irrespectively of whether or not beam forming is applied.

When the TPC command field is "10", $f_c(i)$ is "1 dBm" in the case where beam forming is not applied, and $f_c(i)$ is "3 dBm" in the case where beam forming is applied. When the TPC command field is "11", $f_c(i)$ is "3 dBm" in the case where beam forming is not applied, and $f_c(i)$ is "6 dBm" in the case where beam forming is applied.

Thus, a correction value is high (a step size and a variation range are large) in the case where beam forming is applied compared to the case where beam forming is not applied. A beam of beam forming is formed thin, and therefore an influence (change) caused during movement of the user terminal or by communication environment is significant. Consequently, by making the correction value larger than an existing correction value (a correction value in the case where beam forming is not applied), it is possible to perform correction matching the beam forming. In other words, it is possible to generate a correction value that takes the step size and granularity into account.

In addition, by removing the cell c, the subframe i and the predetermined subscript j, above $P_{CMAX,c}(i)$, $M_{PUSCH,c}(i)$, $P_{O\_PUSCH,c}(j)$, $\alpha_c(j)$, $PL_c$, $\Delta_{TF,c}(i)$ and $f_c(i)$ may be simply expressed as $P_{CMAX}$, $M_{PUSCH}$, $P_{O\_PUSCH}$, $\alpha$, $PL$, and $\Delta_{TF,f}$.

Furthermore, the tables illustrated in above FIGS. 4A and 4B may be notified to the user terminal by higher layer signaling that uses at least one of the MIB, the SIB and the RRC. Furthermore, a table to which numerical values matching beam forming types (modes) to be applied have been configured may be used. In this case, the beam forming type to be applied may be notified to the user terminal by the above higher layer signaling. The table and/or the beam forming type may be dynamically notified by L1/L2 signaling.

Furthermore, the tables illustrated in FIGS. 4A and 4B may be occasionally updated such that the correction value of the TPC command is a cumulative value of TPC commands included in the DCI.

<Transmission Power Control>

Figure 5:
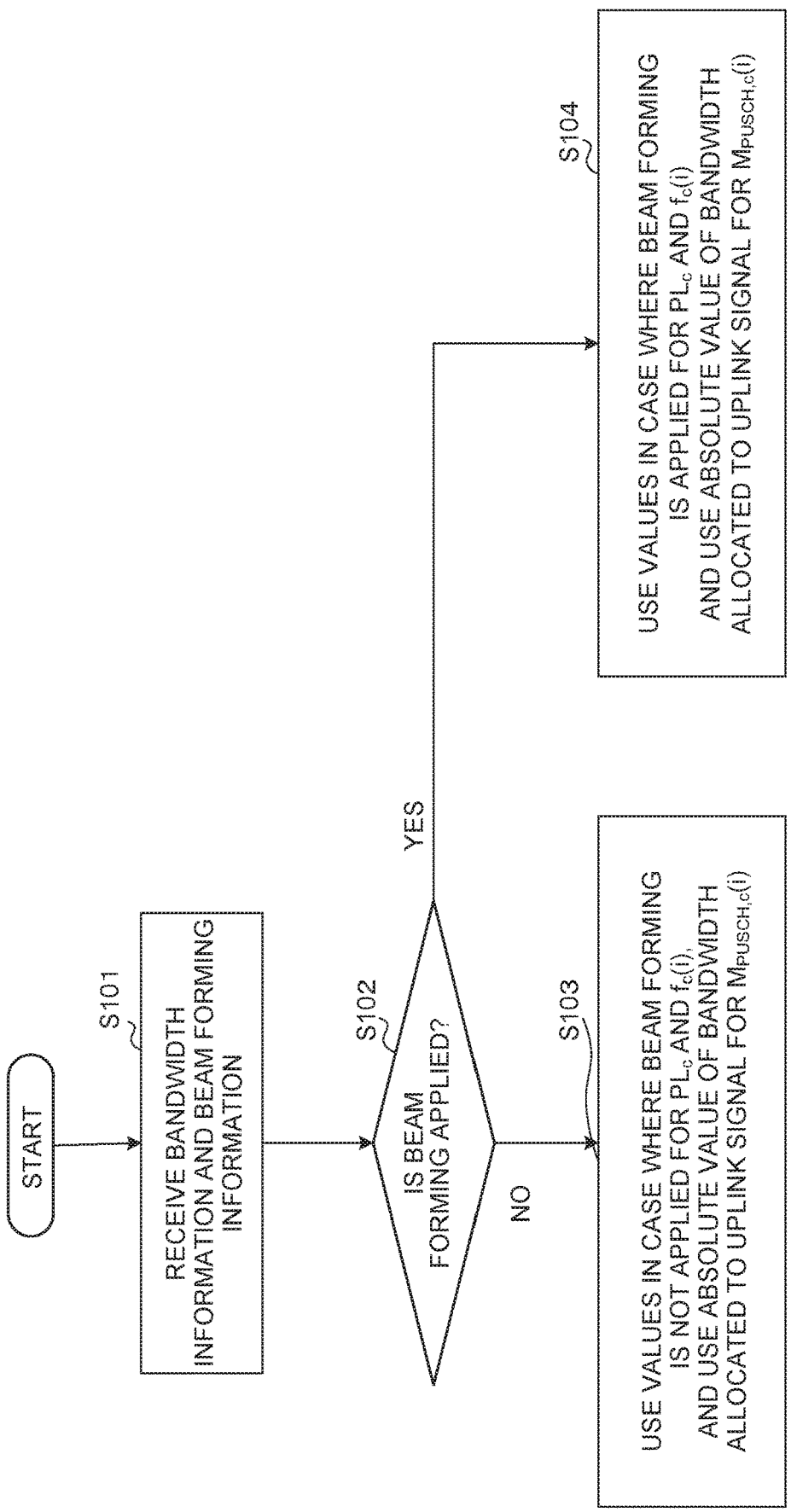
FIG. 5 is a diagram for explaining transmission power control.

Next, one example of transmission power control of the user terminal according to the first aspect will be described with reference to FIG. 5. As illustrated in FIG. 5, the user terminal receives bandwidth information and beam forming information related to beam forming (S101).

The bandwidth information includes an absolute value of a bandwidth to be allocated to an uplink signal. The beam forming information includes information indicating whether or not to apply beam forming and/or information for specifying a beam forming type to be applied. The bandwidth information and the beam forming information are notified by higher layer signaling (RRC signaling) or are dynamically notified by L1/L2 signaling.

The user terminal decides whether or not beam forming is applied to the uplink signal based on the beam forming information (S102). When beam forming is not applied (S102, NO), the user terminal determines the transmission power $P_{PUSCH,c}(i)$ of the uplink signal (PUSCH) by using above equation (1) to transmit the PUSCH (S103). In this case, values in a case where beam forming is not applied are used for $PL_c$ and $f_c(i)$.

More specifically, a value obtained by subtracting RSRP (higher layer filtered RSRP) from reference signal transmission power (reference signal power) notified from the radio base station is used for $PL_c$ that is the path-loss. Furthermore, $f_c(i)$ that is the correction value is obtained from the table illustrated in FIG. 4A. That is, the correction value corresponding to a value (two bits) of the TPC command field is obtained from the table in FIG. 4A. In addition, the absolute value of the bandwidth allocated to the uplink signal is used for $M_{PUSCH,c}(i)$.

On the other hand, when beam forming is applied (S102, YES), the user terminal determines the transmission power $P_{PUSCH,c}(i)$ of the uplink signal (PUSCH) by using above equation (1) to transmit the PUSCH (S104). In this case, values in a case where beam forming is applied are used for $PL_c$ and $f_c(i)$.

More specifically, a value obtained by subtracting beam-formed reference signal received power (higher layer filtered and beam-formed RSRP) from reference signal transmission power (reference signal power) is used for $PL_c$ that is the path-loss. Furthermore, $f_c(i)$ that is the correction value is obtained from the table illustrated in FIG. 4B. That is, the correction value corresponding to a value (two bits) of the TPC command field is obtained from the table in FIG. 4B. In addition, the absolute value of the bandwidth allocated to the uplink signal is used for $M_{PUSCH,c}(i)$ similar to the case where beam forming is not applied.

The transmission power control (S103) in the case where beam forming is not applied and the transmission power control (S104) in the case where beam forming is applied are maintained until the beam forming information is changed (updated). When the beam forming information is changed, processing is performed again from S102. Alternatively, the decision processing in S102 may be performed at a predetermined periodicity.

Figure 6:
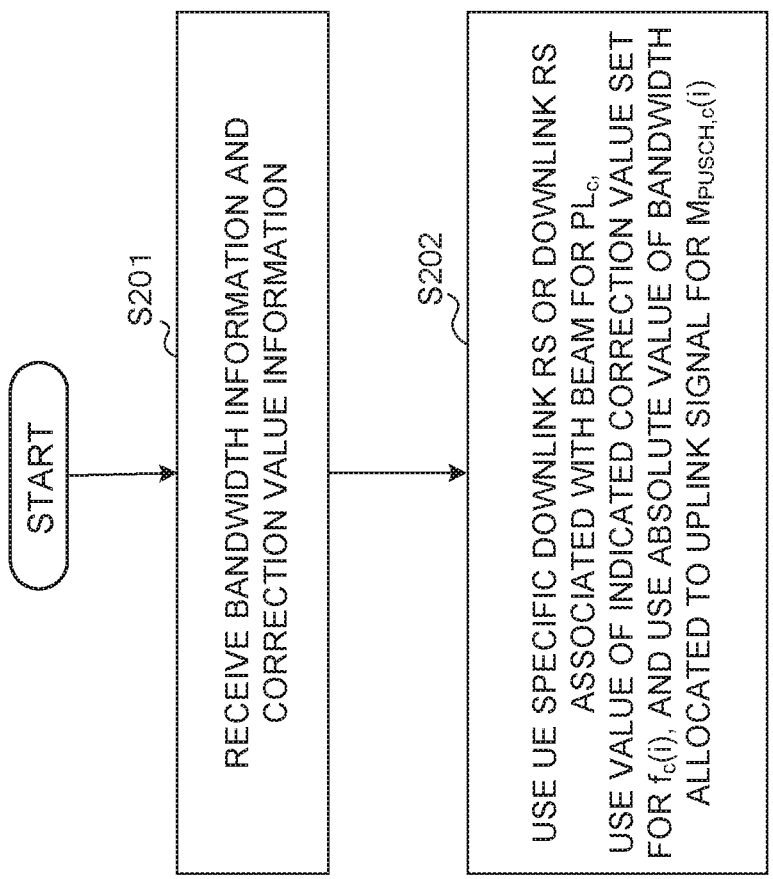
FIG. 6 is a diagram for explaining transmission power control.

In addition, according to the processing based on above FIG. 5, the user terminal decides whether or not to apply beam forming. However, the user terminal does not have to perform this decision processing. This is because it is considered that whether or not to apply beam forming is decided by the radio base station. In this case, the user terminal may perform the processing in FIG. 6 irrespectively of whether or not beam forming is applied.

First, the user terminal receives the bandwidth information and the correction value information (S201). The bandwidth information is the same as that in above FIG. 5. The correction value information is information for indicating one of a plurality of correction value sets (table) configured to the user terminal in advance. The correction value information may include the above TPC command.

The user terminal determines path-loss by using a user terminal (UE) specific downlink reference signal or a downlink reference signal associated with a beam to control transmission power of an uplink signal. Consequently, it is possible to estimate the path-loss that takes the beam into account.

Furthermore, a correction value of the indicated correction value set is used ($f_c(i)$). Furthermore, the user terminal uses the absolute value of the bandwidth allocated to the uplink signal for $M_{PUSCH,c}(i)$ similar to the case where beam forming is not applied.

According to the above processing, irrespectively of whether or not beam forming is applied, the user terminal only needs to perform the same processing.

As described above, according to the first aspect, it is possible to appropriately control transmission power for various techniques such as beam forming and/or numerologies to be introduced for radio communication.

According to, for example, whether or not to apply beam forming, a correction value indicated by a Transmission Power Control (TPC) command is switched. Furthermore, according to whether or not to apply beam forming, Reference Signal Received Power (RSRP) and RSRP that takes a beam forming gain into account are switched to estimate path-loss. According to this processing, the beam forming gain is reflected in transmission power control.

Furthermore, the absolute value of the bandwidth to be allocated to the uplink signal (the PUSCH in the first aspect) is used for the bandwidth (the number of Physical Resource Blocks (PRBs)) used for transmission power control. A subcarrier spacing and the number of subcarriers of one RB are reflected in the absolute value of the bandwidth, so that it is possible to perform transmission power control matching different numerologies.

Furthermore, beam forming applied in the first aspect includes analog beam forming, and multi-beam/multi-stream transmission of the radio base station/the user terminal. Furthermore, to realize a plurality of numerologies, the radio base station may notify the user terminal of the bandwidth information at a predetermined interval (e.g., frame). Furthermore, fractional power control may be realized based on above equation (1). Furthermore, a new downlink reference signal may be introduced to measure path-loss in the case where beam forming is applied.

(Second Aspect)

Next, the second aspect of a radio communication method according to one embodiment of the present invention will be described. This radio communication method controls transmission power of an uplink signal transmitted from a user terminal. In addition, the second aspect of the present embodiment targets at an uplink shared signal (PUSCH) as a transmission power control target uplink signal.

According to the second aspect, following equation (2) is used in place of above equation (1) according to the first aspect.

[Mathematical 2]

$$P_{PUSCH,c}(i) = \min \begin{Bmatrix} P_{CMAX,c}(i), \\ 10\log_{10}(nM_{PUSCH,c}(i)) + P_{O\_PUSCH,c}(j) + \\ \alpha_c(j) \cdot PL_c + \Delta_{TF,c}(i) + f_c(i) \end{Bmatrix} [dBm] \quad \text{(Equation 2)}$$

Equation (2) differs from above equation (1) in a term of $M_{PUSCH,c}(i)$. More specifically, although an absolute value of a bandwidth to be allocated to an uplink signal is used in the first aspect, a bandwidth (e.g., the number of resource blocks) for a PUSCH allocated to the user terminal is multiplied with a scaling factor n in the second aspect.

The scaling factor n is a value that conforms to the numerologies. Hence, $nM_{PUSCH,c}(i)$ of equation (2) is found from the bandwidth (the number of PRBs) for the PUSCH and the numerologies, and takes a value that reflects the numerologies.

According to the second aspect, transmission power control for which $nM_{PUSCH,c}(i)$ is used becomes power control that reflects the numerologies. The scaling factor n may be notified as bandwidth information to the user terminal by higher layer signaling that uses at least one of an MIB, an SIB and RRC. Furthermore, the scaling factor n may be dynamically notified by L1/L2 signaling.

<Transmission power control> according to the second aspect is the same as that in the above first aspect except that the bandwidth information is the scaling factor n and $nM_{PUSCH,c}(i)$ is computed, and therefore detailed description thereof will be omitted.

According to the second aspect, it is possible to appropriately control transmission power for various techniques such as beam forming and/or numerologies to be introduced for radio communication. Particularly, by appropriately configuring the scaling factor n, it is possible to flexibly control transmission power for various types of numerologies.

An effect resulting from whether or not beam forming is applied according to the second aspect is the same as that of the first aspect. For example, according to whether or not to apply beam forming, a correction value indicated by a Transmission Power Control (TPC) command is switched. Furthermore, according to whether or not to apply beam forming, Reference Signal Received Power (RSRP) and RSRP that takes a beam forming gain into account are switched to estimate path-loss. According to this processing, the beam forming gain is reflected in transmission power control.

Furthermore, as a bandwidth (the number of Physical Resource Blocks (PRBs)) used for transmission power control, the bandwidth (e.g., the number of resource blocks) to be allocated to the uplink signal (the PUSCH in the second aspect) is multiplied with the scaling factor n, so that a value that reflects the numerologies is computed. By using the value computed in this way, it is possible to perform transmission power control matching different numerologies.

Furthermore, beam forming applied in the second aspect includes analog beam forming, and multi-beam/multi-stream transmission of the radio base station/the user terminal. Furthermore, to realize a plurality of numerologies, the radio base station may notify the user terminal of the bandwidth information at a predetermined interval (e.g., frame). Furthermore, fractional power control may be realized based on above equation (2). Furthermore, a new downlink reference signal may be introduced to measure path-loss in the case where beam forming is applied.

(Operation According to First Aspect and Second Aspect in Case where Tx/Rx Reciprocity Cannot be Used)

For beam transmission and reception between the radio base station and the user terminal, a transmission method that uses a beam according to whether or not a beam (Tx BF) applied to transmission and a beam (Rx BF) applied to reception by the radio base station (or the user terminal) match may be appropriately controlled. A case where the beam applied to transmission and the beam applied to reception in the radio base station match may be referred to as a case where a Tx/Rx reciprocity can be used (is supported). On the other hand, a case where the beam applied to transmission and the beam applied to reception do not match may be referred to as a case where the Tx/Rx reciprocity cannot be used (is not supported) (see FIG. 7). In this regard, the case where the beam applied to transmission and the beam applied to reception match is not limited to a case where the beams completely match, and includes a case, too, where the beams match within a predetermined allowable range. In addition, the Tx/Rx reciprocity may be referred to as a Tx/Rx beam correspondence, a Tx/Rx correspondence or a beam correspondence.

A case where the Tx/Rx reciprocity cannot be used will be described below. In this regard, irrespectively of the Tx/Rx reciprocity, a beam forming gain needs to be taken into account for DL measurement.

Figure 7A:
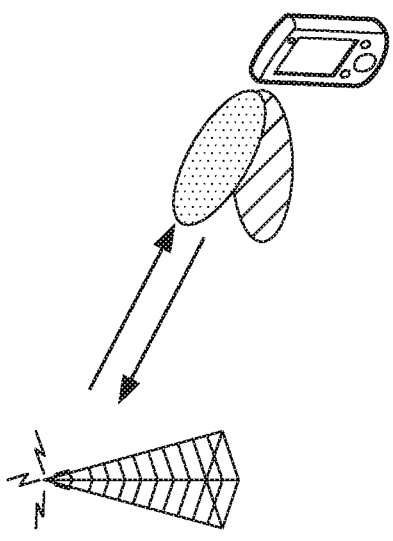
FIGS. 7A and 7B are diagrams for explaining cases where a Tx/Rx reciprocity cannot be used.

When the Tx/Rx reciprocity cannot be used, received signal power lowers, and therefore reliability of DL measurement is insufficient in some cases. For example, FIG. 7A illustrates a state where the radio base station cannot use the Tx/Rx reciprocity. In FIG. 7A, an appropriate beam for the user terminal is configured in the radio base station to transmit DL measurement. On the other hand, a beam is not appropriately configured to receive a signal from the user terminal.

Consequently, received signal power from the user terminal lowers, and therefore the radio base station cannot transmit accurate DL measurement. In this regard, the radio base station can recognize that the radio base station cannot use the Tx/Rx reciprocity, and therefore can be configured to correct insufficient received signal power.

The radio base station recognizes that the radio base station cannot use the Tx/Rx reciprocity, and therefore transmits a signal to the target user terminal by a different beam, and the user terminal specifies a beam of high signal received power. Information of the specified beam is fed back to the radio base station. Furthermore, a reference signal is transmitted from the user terminal to the radio base station, and the beam of the high signal received power is specified. When these two specified beams are similar, it is decided that the Tx/Rx reciprocity can be used, and, when this is not the case, it is decided that the Tx/Rx reciprocity cannot be used.

More specifically, the radio base station configures a high correction value registered in the table in FIG. 4. In this case, a TPC command may be used. Consequently, $f_c(i)$ becomes large, and signal power transmitted from the user terminal increases. Therefore, even in a situation that the Tx/Rx reciprocity cannot be used, the user terminal can use above equations (1) and (2), and received signal power of the radio base station becomes sufficient.

Figure 7B:
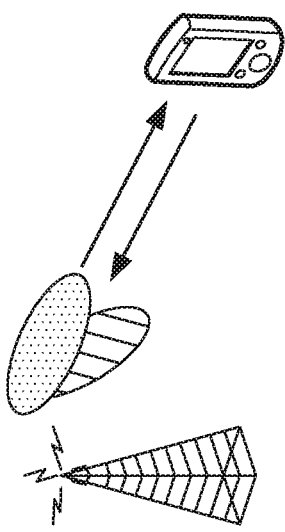

FIG. 7B illustrates a state where the user terminal cannot use the Tx/Rx reciprocity. In FIG. 7B, an appropriate beam for the radio base station is configured in the user terminal to receive DL measurement. On the other hand, a beam is not appropriately configured to transmit a signal from the user terminal.

Therefore, received signal power from the user terminal lowers, and the radio base station cannot transmit accurate DL measurement. In this regard, the radio base station can be configured to detect an appropriate beam when the user terminal transmits the signal, notify the user terminal of the appropriate beam, and transmit the uplink signal by using the beam notified to the user terminal. Therefore, even in a situation that the Tx/Rx reciprocity cannot be used, the user terminal can use above equations (1) and (2), and received signal power in the radio base station becomes sufficient.

DCI may be used to notify an appropriate beam. Furthermore, the user terminal may perform reception measurement processing in order that the radio base station learns an optimal beam.

As described above, even in a state where the Tx/Rx reciprocity cannot be used, it is possible to perform appropriate uplink transmission by indicating a TPC command and/or a transmission beam of the user terminal. Consequently, the user terminal can use equation (1) according to the first aspect or equation (2) according to the second aspect in both of the cases in FIGS. 7A and 7B. In this regard, Closed Loop-Transmission Power Control (CL-TPC) may be applied for this correction. CL-TPC is used, and therefore correction values in the tables in FIGS. 3A and 3B can be preferably configured according to an instruction from the radio base station.

(Third Aspect)

Next, the third aspect of a radio communication method according to one embodiment of the present invention will be described. This radio communication method controls transmission power of an uplink signal transmitted from a user terminal. Although a PUSCH is applied to the uplink signal according to the above first aspect and second aspect, it is also considered to apply an uplink control signal (PUCCH) or a reference signal (SRS) to the uplink signal.

The third aspect will be described targeting at an SRS as a transmission power control target uplink signal. For example, transmission power $P_{SRS,c}(i)$ of the SRS in a subframe i of a cell c can be expressed by following equation (3).

[Mathematical 3]

$$P_{SRS,c}(i) = \min\begin{Bmatrix} P_{CMAX,c}(i), \\ P_{SRS\_OFFSET,c}(m) + 10\log_{10}(M_{SRS,c}) + \\ P_{O\_PUSCH,c}(j) + \alpha_c(j) \cdot PL_c + f_c(i) \end{Bmatrix} [dBm]$$

(Equation 3)

As is clear from comparison between equation (3) and above equation (1), these two equations are very similar. Hence, the same processing as processing of $M_{PUSCH,c}(i)$ of equation (1) in the first aspect is applied to compute $M_{SRS,c}$ of equation (3). That is, $M_{SRS,c}$ indicates an absolute value of a bandwidth to be allocated to an uplink signal. That the absolute value of the bandwidth is used is the same as the above first aspect, and therefore detailed description thereof will be omitted.

Furthermore, the same processing as that applied to $PL_c$ of equation (1) in the first aspect is applied to $PL_c$ of equation (3). That is, a $PL_c$ computing method is switched between a case where beam forming is applied and a case where beam forming is not applied. Furthermore, the same processing as that applied to $f_c(i)$ of equation (1) in the first aspect is applied to $f_c(i)$ of equation (3). That is, a correction value is switched between a case where beam forming is applied and a case where beam forming is not applied. Switching performed according to whether or not to apply beam forming is the same as that in the above first aspect, and therefore detailed description thereof will be omitted.

<Transmission power control> of the user terminal in the third aspect is the same as that in the above first aspect, and therefore detailed description thereof will be omitted.

According to the above third aspect, it is possible to perform transmission power control of an SRS in the same way as transmission power control of a PUSCH in the first aspect, and appropriately control transmission power for various techniques such as beam forming and/or numerologies to be introduced for radio communication.

For example, according to whether or not to apply beam forming, a correction value indicated by a Transmission Power Control (TPC) command is switched. Furthermore, according to whether or not to apply beam forming, Reference Signal Received Power (RSRP) and RSRP that takes a beam forming gain into account are switched to estimate path-loss. According to this processing, the beam forming gain is reflected in transmission power control.

Furthermore, an absolute value of a bandwidth to be allocated to an uplink signal (the SRS in the third aspect) is used for a bandwidth (the number of Physical Resource Blocks (PRBs)) used for transmission power control. A subcarrier spacing and the number of subcarriers of one RB are reflected in the absolute value of the bandwidth, so that it is possible to perform transmission power control matching different numerologies.

(Fourth Aspect)

Next, the fourth aspect of the radio communication method according to one embodiment of the present invention will be described. The fourth aspect of this radio communication method will be described targeting at an SRS as an uplink signal transmitted from a user terminal.

According to the fourth aspect, following equation (4) is used in place of above equation (3) according to the third aspect.

[Mathematical 4]

$$P_{SRS,c}(i) = \min\begin{Bmatrix} P_{CMAX,c}(i), \\ P_{SRS\_OFFSET,c}(m) + 10\log_{10}(nM_{SRS,c}) + \\ P_{O\_PUSCH,c}(j) + \alpha_c(j) \cdot PL_c + f_c(i) \end{Bmatrix} [dBm]$$

(Equation 4)

Equation (4) differs from above equation (3) in a term of $M_{SRS,c}$. More specifically, although an absolute value of a bandwidth to be allocated to an uplink signal is used in the third aspect, a bandwidth (e.g., the number of resource blocks) for an SRS allocated to the user terminal is multiplied with a scaling factor n in the fourth aspect.

The scaling factor n is a value that conforms to numerologies. Hence, $nM_{SRS,c}$ of equation (2) is calculated from the bandwidth (the number of PRBs) for the SRS and the numerologies, and takes a value that reflects the numerologies.

According to the fourth aspect, transmission power control that uses $nM_{SRS,c}$ is power control that reflects the numerologies. The scaling factor n may be notified as bandwidth information to the user terminal by higher layer signaling that uses at least one of an MIB, an SIB and RRC. Furthermore, the scaling factor n may be dynamically notified by L1/L2 signaling.

<Transmission power control> of the user terminal according to the fourth aspect is the same as that of the above third aspect except that the bandwidth information is the scaling factor n and $nM_{SRS,c}$ is computed, and therefore detailed description thereof will be omitted.

According to the fourth aspect, it is possible to appropriately control transmission power for various techniques such as beam forming and/or numerologies to be introduced for radio communication. Particularly, by appropriately configuring the scaling factor n, it is possible to flexibly control transmission power for various types of numerologies. An effect resulting from whether or not beam forming is applied according to the fourth aspect is the same as that of the third aspect.

(Radio Communication System)

The configuration of the radio communication system according to the present embodiment will be described below. This radio communication system is applied the radio communication method according to each of the above aspects. In this regard, the radio communication method according to each of the above aspects may be applied alone or may be applied in combination.

Figure 8:
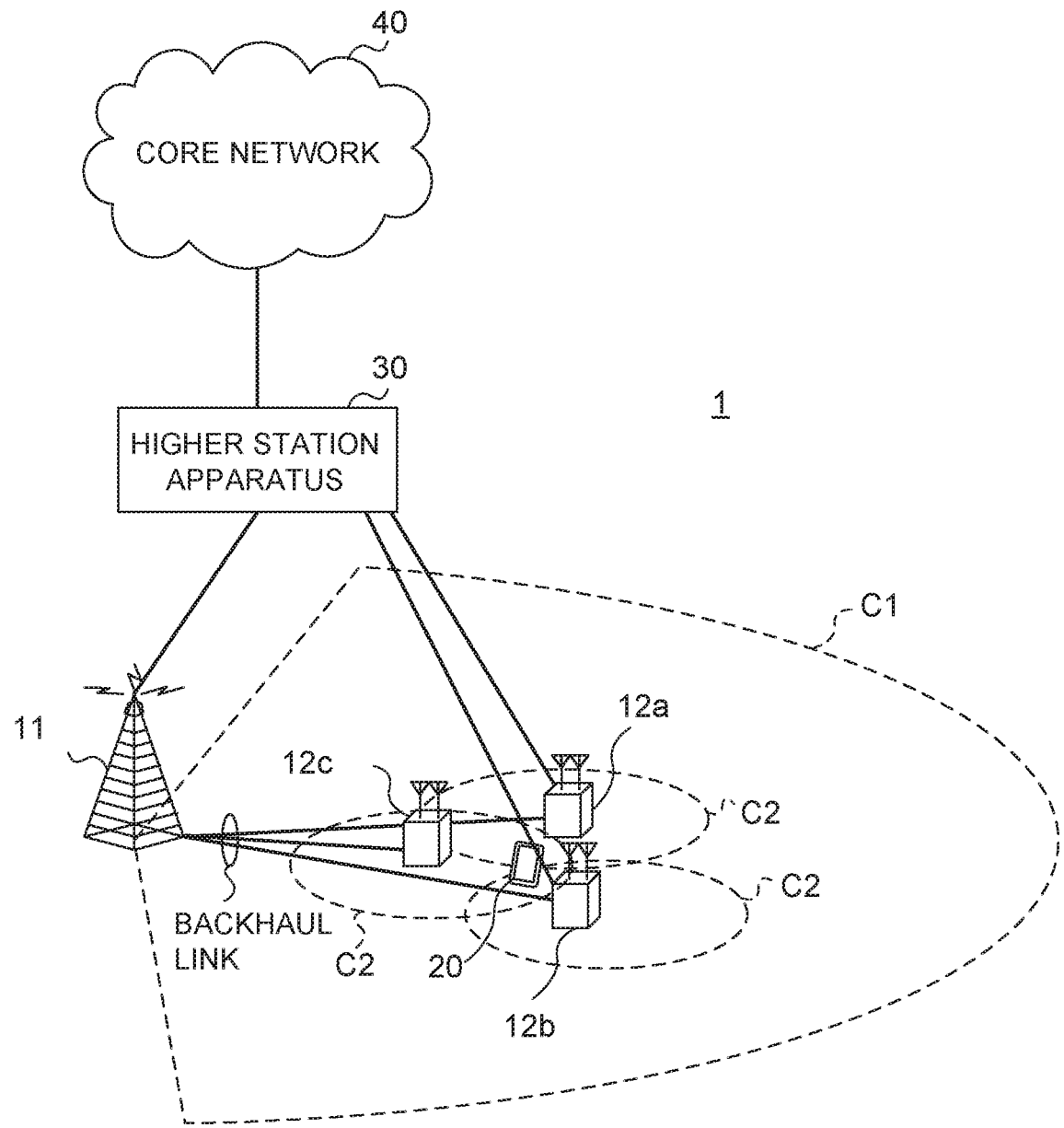
FIG. 8 is a diagram illustrating one example of a schematic configuration of a radio communication system according to the present embodiment.

FIG. 8 is a diagram illustrating one example of a schematic configuration of the radio communication system according to the present embodiment. A radio communication system 1 can apply Carrier Aggregation (CA) and/or Dual Connectivity (DC) that aggregate a plurality of base frequency blocks (component carriers) whose one unit is a system bandwidth (e.g., 20 MHz) of the LTE system. In this regard, the radio communication system 1 may be referred to as SUPER 3G, LTE-Advanced (LTE-A), IMT-Advanced, 4G, 5G, Future Radio Access (FRA) and the New Radio Access Technology (New-RAT (NR)).

Furthermore, the radio communication system 1 can be applied various techniques (numerologies and beam forming).

The radio communication system 1 illustrated in FIG. 8 includes a radio base station 11 that forms a macro cell C1, and radio base stations 12a to 12c that are located in the macro cell C1 and form small cells C2 narrower than the macro cell C1. Furthermore, a user terminal 20 is located in the macro cell C1 and each small cell C2. A different numerology may be configured to be applied between cells and/or in each cell.

The user terminal 20 can connect with both of the radio base station 11 and the radio base stations 12. The user terminal 20 is assumed to concurrently use the macro cell C1 and the small cells C2 that use different frequencies by CA or DC. Furthermore, the user terminal 20 can apply CA or DC by using a plurality of cells (CCs) (e.g., two or more CCs). Furthermore, the user terminal can use licensed band CCs and unlicensed band CCs as a plurality of cells.

Furthermore, the user terminal 20 can perform communication by using Time Division Duplex (TDD) or Frequency Division Duplex (FDD) in each cell. A TDD cell and an FDD cell may be referred to as a TDD carrier (frame configuration type 2) and an FDD carrier (frame configuration type 1), respectively.

Furthermore, each cell (carrier) may be applied a single numerology or may be applied a plurality of different numerologies.

The user terminal 20 and the radio base station 11 can communicate by using a carrier (referred to as a Legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz, 5 GHz or 30 to 70 GHz) or may use the same carrier as that used between the user terminal 20 and the radio base station 11. In this regard, a configuration of the frequency band used by each radio base station is not limited to this.

The radio base station 11 and each radio base station 12 (or the two radio base stations 12) can be configured to be connected by way of wired connection (e.g., optical fibers compliant with a Common Public Radio Interface (CPRI) or an X2 interface) or by way of radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB), a gNB or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal but also a fixed communication terminal. Furthermore, the user terminal 20 can perform Device To Device (D2D) communication with the other user terminals 20.

The radio communication system 1 applies Orthogonal Frequency-Division Multiple Access (OFDMA) to Down-Link (DL) and Single Carrier Frequency Division Multiple Access (SC-FDMA) to UpLink (UL) as radio access schemes. OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band including one or contiguous resource blocks per terminal and causes a plurality of terminals to use respectively different bands to reduce an inter-terminal interference. In this regard, uplink and downlink radio access schemes are not limited to a combination of these, and OFDMA may be used on UL.

The radio communication system 1 uses a DL shared channel (also referred to as a PDSCH: Physical Downlink Shared Channel or a DL data channel) shared by each user terminal 20, a broadcast channel (PBCH: Physical Broadcast Channel) and an L1/L2 control channel as DL channels. User data, higher layer control information and System Information Blocks (SIB) are transmitted on the PDSCH. Furthermore, Master Information Blocks (MIB) are transmitted on the PBCH.

The L1/L2 control channel includes a DL control channel (a Physical Downlink Control Channel (PDCCH) and an Enhanced Physical Downlink Control Channel (EPDCCH)), a Physical Control Format Indicator Channel (PCFICH) and a Physical Hybrid-ARQ Indicator Channel (PHICH). Downlink Control Information (DCI) including scheduling information of the PDSCH and the PUSCH is transmitted on the PDCCH. The number of OFDM symbols used for the PDCCH is transmitted on the PCFICH. The EPDCCH is subjected to frequency division multiplexing with the PDSCH and is used to transmit DCI similar to the PDCCH. Retransmission instruction information (ACK/NACK) of HARQ for a PUSCH can be transmitted on at least one of the PHICH, the PDCCH and the EPDCCH.

The radio communication system 1 uses a UL shared channel (also referred to as a PUSCH: Physical Uplink Shared Channel and a UL data channel) shared by each user terminal 20, a UL control channel (PUCCH: Physical Uplink Control Channel), and a random access channel (PRACH: Physical Random Access Channel) as UL channels. User data and higher layer control information are transmitted on the PUSCH. Uplink Control Information (UCI) including at least one of retransmission control information (e.g., A/N) of a DL signal and Channel State Information (CSI) is transmitted on the PUSCH or a PUCCH. A random access preamble for establishing connection with cells can be transmitted on the PRACH.

Communication between the radio base stations 11 and 12 and the user terminal 20 supports analog beam forming, multi-beam/multi-stream transmission and a plurality of numerologies.

<Radio Base Station>

Figure 9:
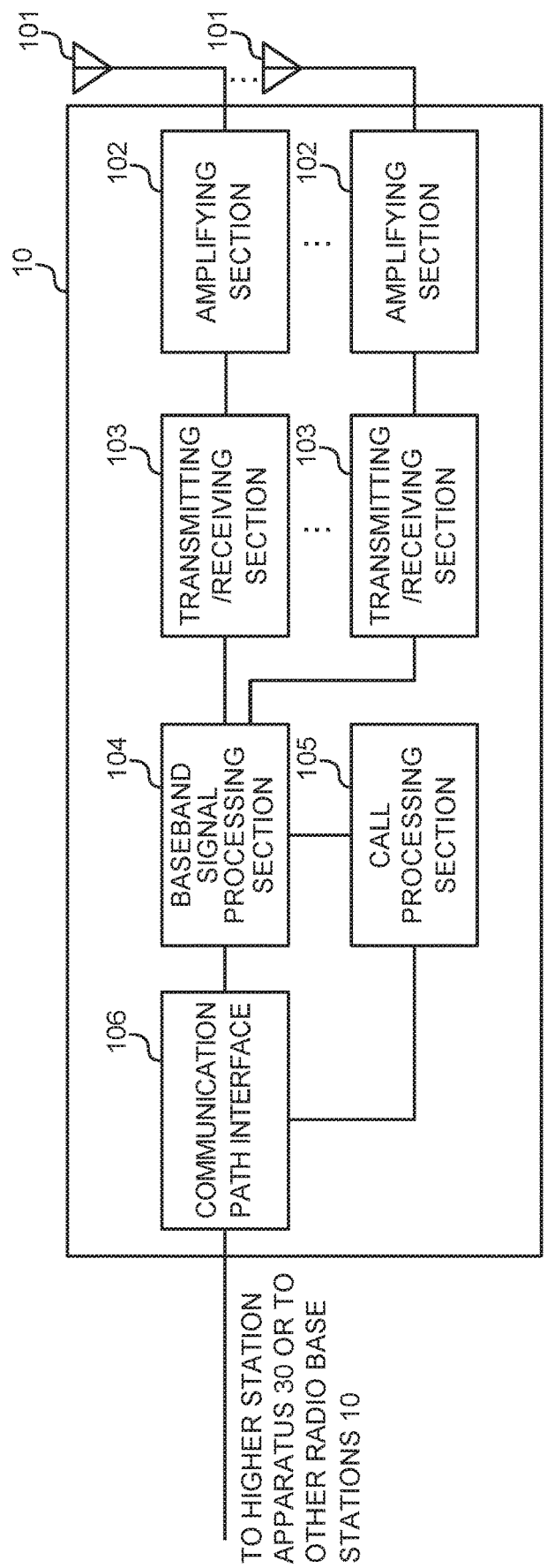
FIG. 9 is a diagram illustrating one example of an overall configuration of a radio base station according to the present embodiment.

FIG. 9 is a diagram illustrating one example of an overall configuration of the radio base station according to the present embodiment. The radio base station 10 includes pluralities of transmission/reception antennas 101, amplifying sections 102 and transmission/reception sections 103, a baseband signal processing section 104, a call processing section 105 and a channel interface 106. In this regard, the radio base station 10 only needs to be configured to include one or more of each of the transmission/reception antennas 101, the amplifying sections 102 and the transmission/reception sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of an RLC layer such as Radio Link Control (RLC) retransmission control, Medium Access Control (MAC) retransmission control (such as HARQ transmission processing), and transmission processing such as scheduling, transmission format selection, channel coding, Inverse Fast Fourier Transform (IFFT) processing, and precoding processing on the user data, and transfers the user data to each transmission/reception section 103. Furthermore, the baseband signal processing section 104 performs transmission processing such as channel coding and inverse fast Fourier transform on a downlink control signal, too, and transfers the downlink control signal to each transmission/reception section 103.

Each transmission/reception section 103 converts a baseband signal precoded and output per antenna from the baseband signal processing section 104 into a radio frequency band, and transmits a radio frequency signal. The radio frequency signal subjected to frequency conversion by each transmission/reception section 103 is amplified by each amplifying section 102, and is transmitted from each transmission/reception antenna 101.

The transmission/reception sections 103 can be composed of transmitters/receivers, transmission/reception circuits or transmission/reception apparatuses described based on a common knowledge in a technical field according to the present invention. In this regard, the transmission/reception sections 103 may be composed as an integrated transmission/reception section or may be composed of transmission sections and reception sections.

On the other hand, each amplifying section 102 amplifies a radio frequency signal as a UL signal received by each transmission/reception antenna 101. Each transmission/reception section 103 receives the UL signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on UL data included in the input UL signal, and transfers the UL data to the higher station apparatus 30 via the channel interface 106. The call processing section 105 performs call processing such as a configuration and release of a communication channel, state management of the radio base station 10, and radio resource management.

The channel interface 106 transmits and receives signals to and from the higher station apparatus 30 via a predetermined interface. Furthermore, the channel interface 106 may transmit and receive (backhaul signaling) signals to and from the neighbor radio base station 10 via an inter-base station interface (e.g., optical fibers compliant with the Common Public Radio Interface (CPRI) or the X2 interface).

Furthermore, each transmission/reception section 103 receives UE capability information, and transmits the UE capability information to the baseband signal processing section 104. Furthermore, each transmission/reception section 103 transmits band information transmitted from the baseband signal processing section 104 to the user terminal 20.

Figure 10:
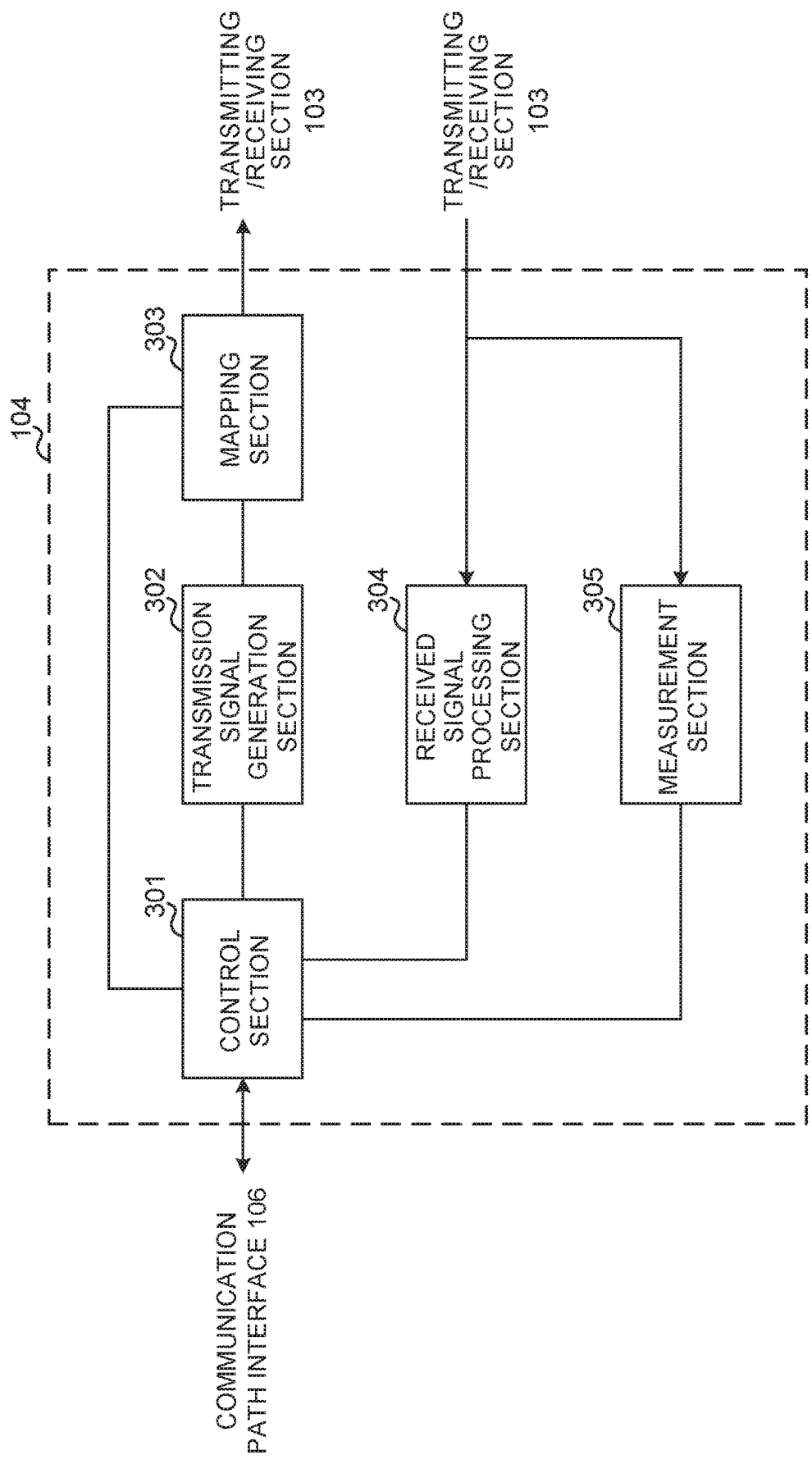
FIG. 10 is a diagram illustrating one example of a function configuration of the radio base station according to the present embodiment.

FIG. 10 is a diagram illustrating one example of a function configuration of the radio base station according to the present embodiment. In addition. FIG. 10 mainly illustrates function blocks of characteristic portions according to the present embodiment, and assumes that the radio base station 10 includes other function blocks, too, that are necessary for radio communication. As illustrated in FIG. 10, the baseband signal processing section 104 includes a control section 301, a transmission signal generating section 302, a mapping section 303, a received signal processing section 304 and a measurement section 305.

The control section 301 controls the entire radio base station 10. The control section 301 controls, for example, DL signal generation of the transmission signal generating section 302, DL signal mapping of the mapping section 303, UL signal reception processing (e.g., demodulation) of the received signal processing section 304, and measurement of the measurement section 305.

For example, the control section 301 performs control to support at least one of the first to fourth aspects of the above embodiment. For example, the control section 301 performs control to notify the user terminal of at least one of bandwidth information, beam forming information and correction value information. More specifically, the control section 301 notifies the user terminal of an absolute value of a bandwidth to be allocated to an uplink signal (a PUCCH, a PUSCH or an SRS) as bandwidth information. Furthermore, the control section 301 notifies the user terminal of whether or not beam forming is applied and/or a beam forming mode (type) as beam forming information. Furthermore, the control section 301 notifies the user terminal of information indicating one of a plurality of correction value sets as correction value information when a plurality of correction value sets (tables) are provided. Furthermore, the control section 301 may notify the user terminal of a scaling factor according to numerologies instead of the absolute value of the bandwidth.

The control section 301 can be composed of a controller, a control circuit or a control apparatus described based on the common knowledge in the technical field according to the present invention.

The transmission signal generating section 302 generates DL signals (including DL data, scheduling information and shortened TTI configuration information) based on an instruction from the control section 301, and outputs the DL signals to the mapping section 303.

The transmission signal generating section 302 can be composed of a signal generator, a signal generating circuit or a signal generating apparatus described based on the common knowledge in the technical field according to the present invention.

The mapping section 303 maps the DL signal generated by the transmission signal generating section 302, on a predetermined radio resource based on the instruction from the control section 301, and outputs the DL signal to each transmission/reception section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a UL signal (e.g., a UL data signal, a UL control signal, UCI and short TTI support information) transmitted from the user terminal 20. More specifically, the received signal processing section 304 performs reception processing on the UL signal based on the numerologies configured to the user terminal 20. Furthermore, the received signal processing section 304 may output the received signal and the signal after the reception processing to the measurement section 305. Furthermore, the received signal processing section 304 performs reception processing on A/N of the DL signal, and outputs ACK or NACK to the control section 301.

The measurement section 305 performs measurement related to the received signal. The measurement section 305 can be composed of a measurement instrument, a measurement circuit or a measurement apparatus described based on the common knowledge in the technical field according to the present invention.

The measurement section 305 may measure UL channel quality based on, for example, received power (e.g., Reference Signal Received Power (RSRP)) and/or received quality (e.g., Reference Signal Received Quality (RSRQ)) of a UL reference signal. The measurement section 305 may output a measurement result to the control section 301.

<User Terminal>

Figure 11:
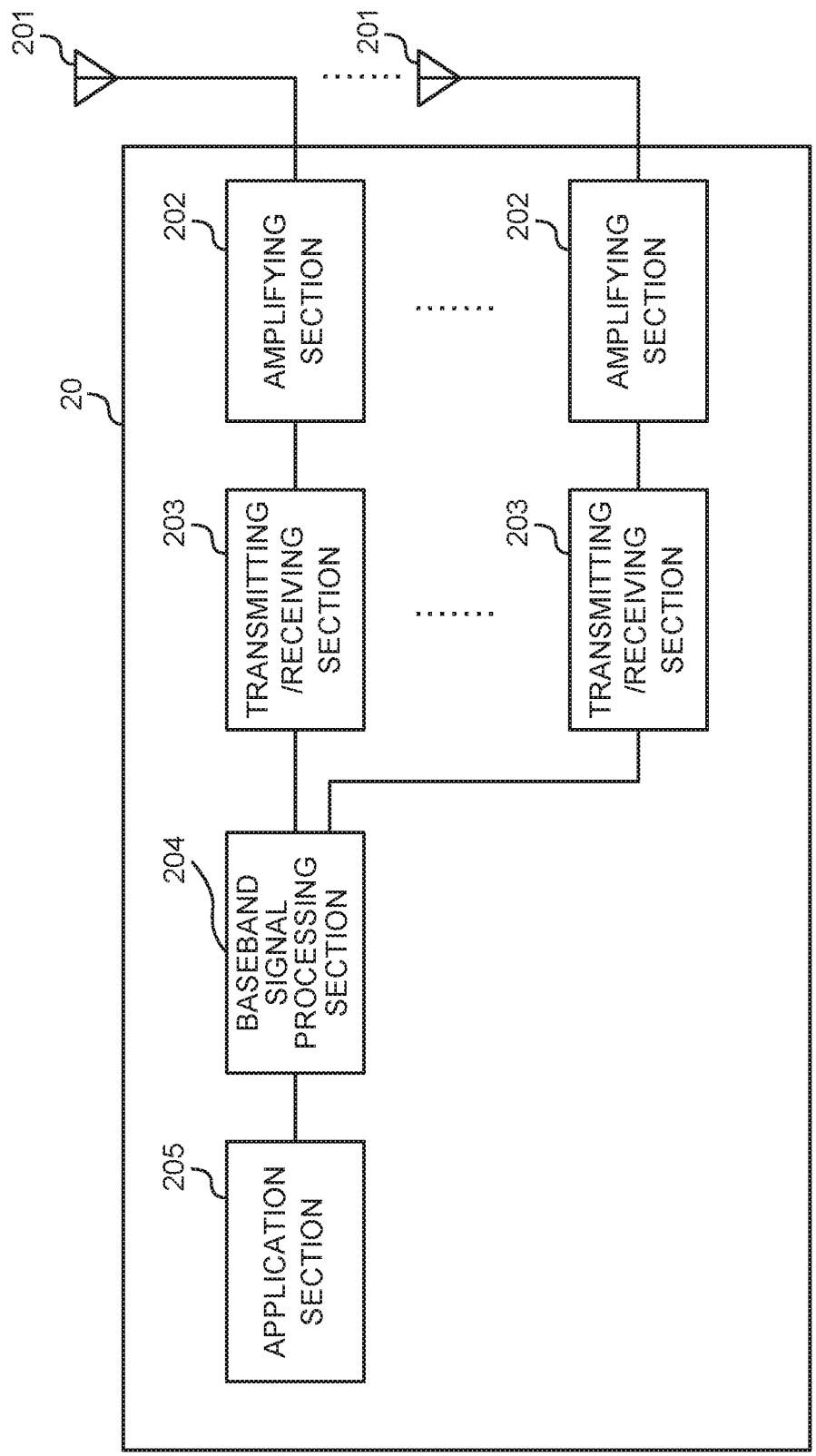
FIG. 11 is a diagram illustrating one example of an overall configuration of a user terminal according to the present embodiment.

FIG. 11 is a diagram illustrating one example of an overall configuration of the user terminal according to the present embodiment. The user terminal 20 includes pluralities of transmission/reception antennas 201 for MIMO transmission, amplifying sections 202 and transmission/reception sections 203, a baseband signal processing section 204 and an application section 205.

The amplifying sections 202 amplify radio frequency signals received at a plurality of transmission/reception antennas 201, respectively. Each transmission/reception section 203 receives a DL signal amplified by each amplifying section 202. Each transmission/reception section 203 performs frequency conversion on the received signal into a baseband signal, and outputs the baseband signal to the baseband signal processing section 204.

The baseband signal processing section 204 performs FFT processing, error correcting decoding, and reception processing of retransmission control on the input baseband signal. The baseband signal processing section 204 transfers DL data to the application section 205. The application section 205 performs processing related to layers higher than a physical layer and an MAC layer. Furthermore, the baseband signal processing section 204 may transfer broadcast information, too, to the application section 205.

On the other hand, the application section 205 inputs UL data to the baseband signal processing section 204. The baseband signal processing section 204 performs transmission processing of retransmission control (e.g., HARQ transmission processing), channel coding, rate matching, puncturing, Discrete Fourier Transform (DFT) processing and IFFT processing on the UL data, and transfers the UL data to each transmission/reception section 203. The baseband signal processing section 204 performs channel coding, rate matching, puncturing, DFT processing and IFFT processing on the UCI (e.g., DL retransmission control information and channel state information), too, and transfers the UCI to each transmission/reception section 203.

The baseband signal processing section 204 may include a plurality of bandwidth signal systems as described in, for example, above UE configuration examples 1 and 2.

Each transmission/reception section 203 converts the baseband signal output from the baseband signal processing section 204 into a radio frequency band, and transmits a radio frequency signal. The radio frequency signal subjected to the frequency conversion by each transmission/reception section 203 is amplified by each amplifying section 202, and is transmitted from each transmission/reception antenna 201.

Furthermore, each transmission/reception section 203 receives band information, and transmits the band information to the baseband signal processing section 204. Furthermore, each transmission/reception section 203 transmits UE capability information transmitted from the baseband signal processing section 204 to the radio base stations 11 and 12. In this regard, the band information indicates a DL candidate band that is an allocation candidate band of a DownLink (DL) signal and/or a UL candidate band that is an allocation candidate band of an UpLink (UL) signal.

Furthermore, each transmission/reception section 203 receives a broadcast signal in a frequency resource corresponding to a frequency raster that has detected a synchronization signal.

The transmission/reception sections 203 can be composed of transmitters/receivers, transmission/reception circuits or transmission/reception apparatuses described based on the common knowledge in the technical field according to the present invention. Furthermore, the transmission/reception sections 203 may be composed as an integrated transmission/reception section or may be composed of transmission sections and reception sections.

Figure 12:
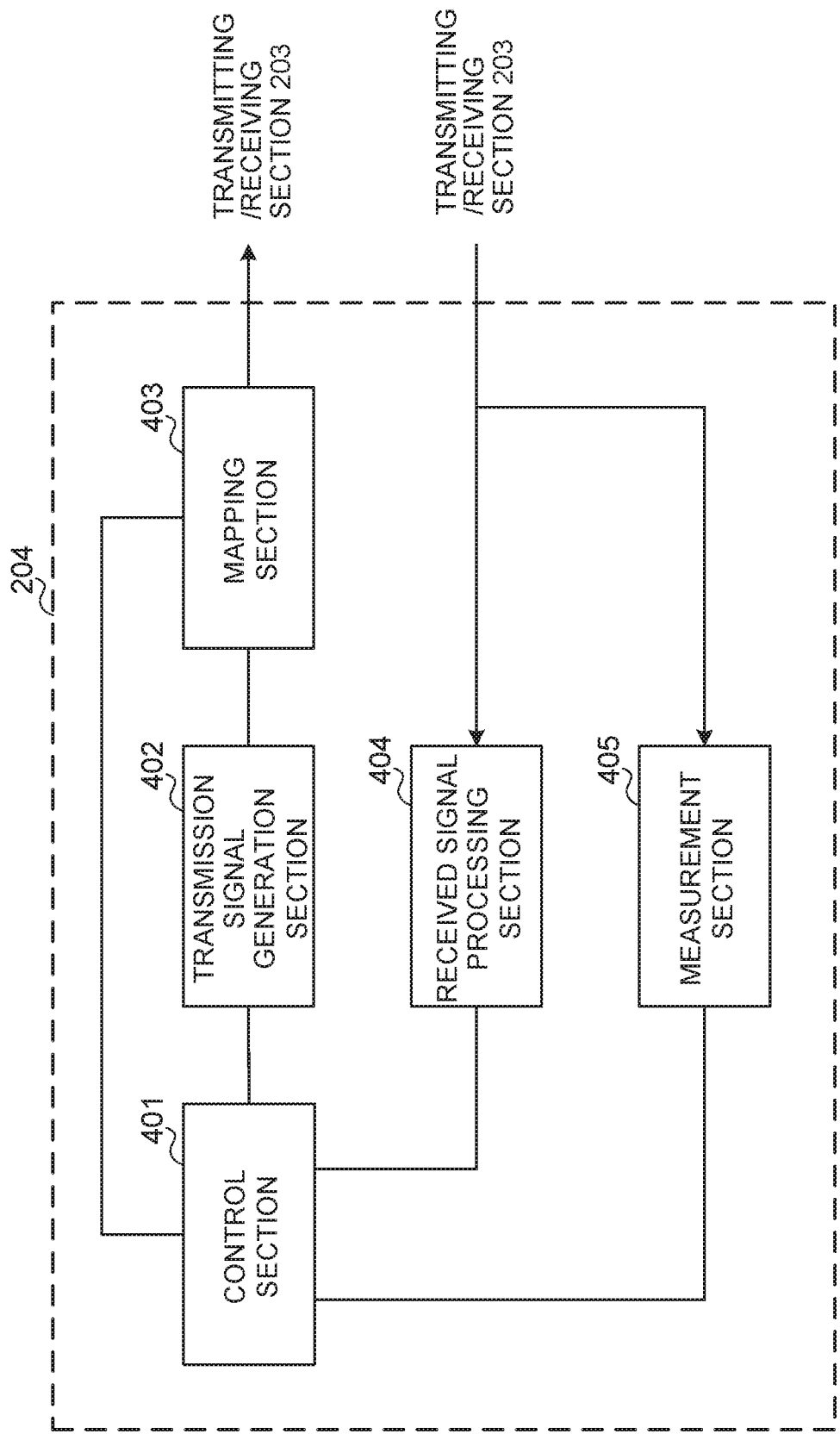
FIG. 12 is a diagram illustrating one example of a function configuration of the user terminal according to the present embodiment.

FIG. 12 is a diagram illustrating one example of a function configuration of the user terminal according to the present embodiment. In addition. FIG. 12 mainly illustrates function blocks of characteristic portions according to the present embodiment, and assumes that the user terminal 20 includes other function blocks, too, that are necessary for radio communication. As illustrated in FIG. 12, the baseband signal processing section 204 of the user terminal 20 includes a control section 401, a transmission signal generating section 402, a mapping section 403, a received signal processing section 404 and a measurement section 405.

The control section 401 controls the entire user terminal 20. The control section 401 controls, for example, UL signal generation of the transmission signal generating section 402, UL signal mapping of the mapping section 403, DL signal reception processing of the received signal processing section 404, and measurement of the measurement section 405.

Furthermore, the control section 401 performs control to support at least one of the first to fourth aspects of the above embodiment. For example, the control section 401 controls transmission power of an uplink signal (a PUCCH, a PUSCH or an SRS) based on bandwidth information and/or beam forming information notified from the radio base station. Above equations (1) to (4) may be used.

The control section 401 performs control to use path-loss estimated by using a downlink UE specific reference signal to which downlink beam forming has been applied and/or a reference signal associated with a beam, and/or Reference Signal Received Power (RSRP) for transmission power control, and/or determine a correction value indicated by a Transmission Power Control (TPC) command according to application of beam forming and the beam forming mode.

Furthermore, the control section 401 performs control to use for a bandwidth (the number of Physical Resource Blocks (PRBs)) used for the transmission power control an absolute value of a bandwidth to be allocated to an uplink signal (e.g., a Physical Uplink Shard Channel (PUSCH), a Physical Uplink Control Channel (PUCCH) and a Sounding Reference Signal (SRS)) or a value computed based on the number of resource blocks and numerologies.

When controlling transmission power of the uplink signal based on the received power or based on the received power and the TPC command, the control section 401 may perform control to use the received power or path-loss based on the received power.

When applying beam forming to the uplink signal, the control section 401 may perform control such that a value indicated by the TPC command is larger than a value in a case where beam forming is not applied to the uplink signal.

Furthermore, the control section 401 uses the absolute value of the bandwidth to be allocated to the uplink signal (the PUSCH in the first aspect and the SRS in the third aspect) for the bandwidth (the number of Physical Resource Blocks (PRBs)) used for transmission power control. A subcarrier spacing and the number of subcarriers of one RB are reflected in the absolute value of the bandwidth, and therefore the control section 401 may perform transmission power control matching different numerologies.

Furthermore, the control section 401 controls the transmission power by multiplying the bandwidth (e.g., the number of resource blocks) of the uplink signal allocated to the user terminal with the scaling factor n. The scaling factor n is a value that conforms to the numerologies, and the control section 401 may control transmission power by using the value calculated from the bandwidth (the number of PRBs) of the uplink signal and the numerologies.

The control section 401 can be composed of a controller, a control circuit or a control apparatus described based on the common knowledge in the technical field according to the present invention.

The transmission signal generating section 402 generates (e.g., encodes, rate-matches, punctures and modulates) a UL signal (including a UL data signal, a UL control signal, a UL reference signal, UCI and short TTI support information) based on an instruction from the control section 401, and outputs the UL signal to the mapping section 403. The transmission signal generating section 402 can be composed of a signal generator, a signal generating circuit or a signal generating apparatus described based on the common knowledge in the technical field according to the present invention.

The mapping section 403 maps the UL signal generated by the transmission signal generating section 402, on a radio resource based on the instruction from the control section 401, and outputs the UL signal to each transmission/reception section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the DL signal (a DL data signal, scheduling information, a DL control signal, a DL reference signal and short TTI configuration information). The received signal processing section 404 outputs information received from the radio base station 10 to the control section 401. The received signal processing section 404 outputs, for example, broadcast information, system information, higher layer control information of higher layer signaling such as RRC signaling, and physical layer control information (L1/L2 control information) to the control section 401.

The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The measurement section 405 measures a channel state based on a reference signal (e.g., CSI-RS) from the radio base station 10, and outputs a measurement result to the control section 401. In addition, the measurement section 405 may measure a channel state per CC.

The measurement section 405 can be composed of a signal processor, a signal processing circuit or a signal processing apparatus, and a measurement instrument, a measurement circuit or a measurement apparatus described based on the common knowledge in the technical field according to the present invention.

(Hardware Configuration)

In addition, the block diagrams used to describe the above embodiment illustrate blocks in function units. These function blocks (components) are realized by an optional combination of hardware and/or software. Furthermore, means for realizing each function block is not limited in particular. That is, each function block may be realized by one physically and/or logically coupled apparatus or may be realized by a plurality of these apparatuses formed by connecting two or more physically and/or logically separate apparatuses directly and/or indirectly (by way of, for example, wired connection and/or radio connection).

Figure 13:
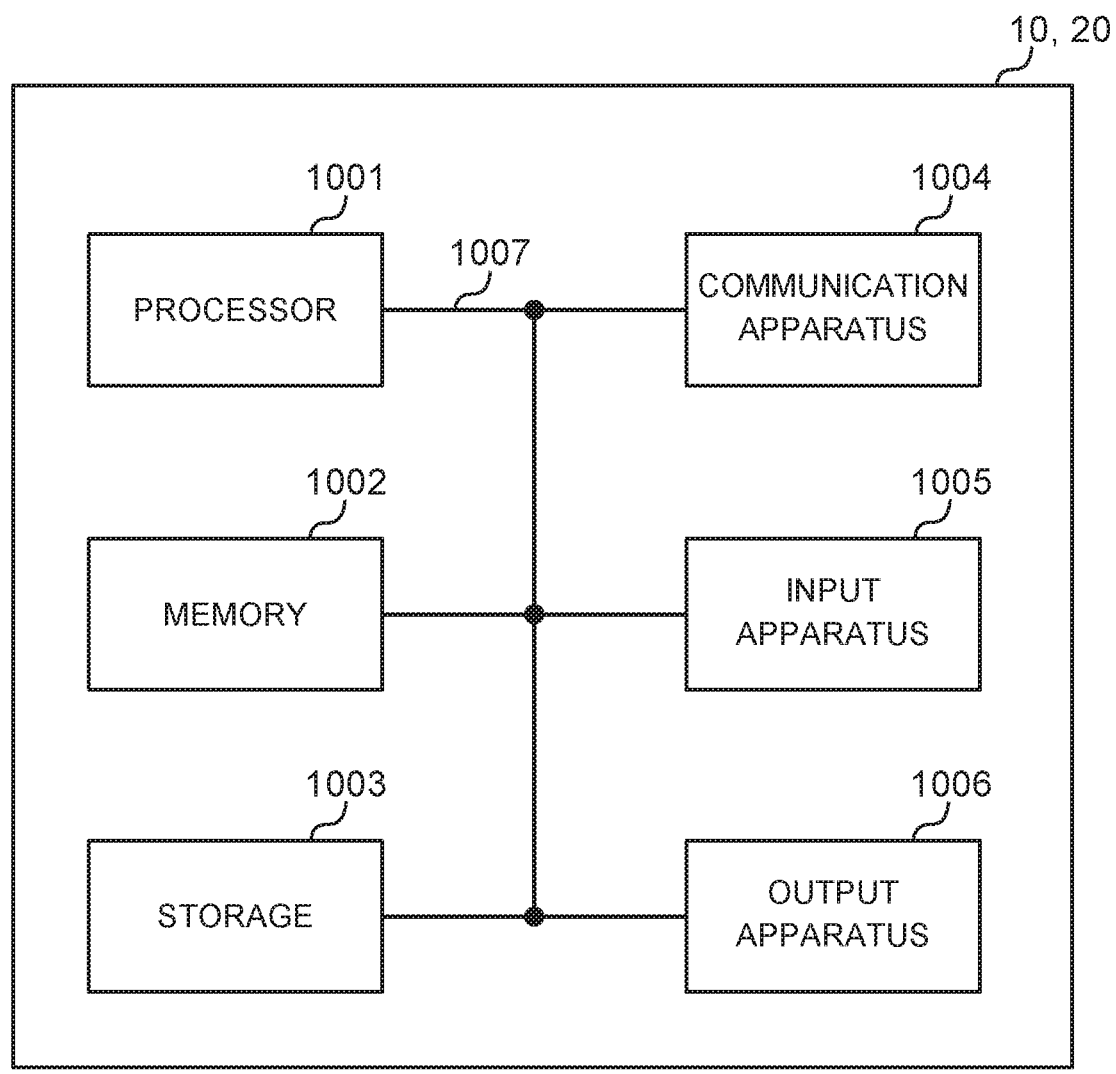
FIG. 13 is a diagram illustrating one example of hardware configurations of the radio base station and the user terminal according to the present embodiment.

For example, the radio base station and the user terminal according to the one embodiment of the present invention may function as computers that perform processing of the radio communication method according to the present invention. FIG. 13 is a diagram illustrating one example of the hardware configurations of the radio base station and the user terminal according to the one embodiment of the present invention. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 13 or may be configured without including part of the apparatuses.

For example, FIG. 13 illustrates the only one processor 1001. However, there may be a plurality of processors. Furthermore, processing may be executed by one processor or may be executed by one or more processors concurrently, successively or by another method. In addition, the processor 1001 may be implemented by one or more chips.

Each function of the radio base station 10 and the user terminal 20 is realized by, for example, causing hardware such as the processor 1001 and the memory 1002 to read predetermined software (program), and thereby causing the processor 1001 to perform an operation, and control communication of the communication apparatus 1004 and reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiment are used. For example, the control section 401 of the user terminal 20 may be realized by a control program stored in the memory 1002 and operating on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the one embodiment of the present invention.

The storage 1003 is a computer-readable recording medium and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via a wired and/or radio network, and is also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above transmission/reception antennas 101 (201), amplifying sections 102 (202), transmission/reception sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed of a single bus or may be composed of buses that are different between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may realize part or all of each function block. For example, the processor 1001 may be implemented by at least one of these types of hardware.

Modified Example

In addition, each term that is described in this description and/or each term that is necessary to understand this description may be replaced with terms having identical or similar meanings. For example, a channel and/or a symbol may be signals (signaling). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of periods (frames) in a time domain. Each of one or a plurality of periods (frames) that composes a radio frame may be referred to as a subframe. Furthermore, the subframe may include one or a plurality of slots in the time domain. The subframe may be a fixed time duration (e.g., one ms) that does not depend on the numerologies.

Furthermore, the slot may include one or a plurality of symbols (Orthogonal Frequency Division Multiplexing (OFDM) symbols or Single Carrier Frequency Division Multiple Access (SC-FDMA) symbols) in the time domain. Furthermore, the slot may be a time unit based on the numerologies. Furthermore, the slot may include a plurality of mini slots. Each mini slot may include one or a plurality of symbols in the time domain. Furthermore, the mini slot may be referred to as a subslot.

The radio frame, the subframe, the slot, the mini slot and the symbol each indicate a time unit for transmitting signals. The other corresponding names may be used for the radio frame, the subframe, the slot, the mini slot and the symbol. For example, one subframe may be referred to as a Transmission Time Interval (TTI), a plurality of contiguous subframes may be referred to as TTIs. or one slot or one mini slot may be referred to as a TTI. That is, the subframe and/or the TTI may be a subframe (one ms) according to legacy LTE, may be a period (e.g., 1 to 13 symbols) shorter than one ms or may be a period longer than one ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used by each user terminal) in TTI units to each user terminal. In this regard, a definition of the TTI is not limited to this.

The TTI may be a transmission time unit of a channel-coded data packet (transport block), a code block and/or a codeword, or may be a processing unit of scheduling or link adaptation. In addition, when the TTI is given, a time interval (e.g., the number of symbols) in which a transport block, a code block and/or a codeword are actually mapped may be shorter than the TTI.

In addition, when one slot or one mini slot is referred to as a TTI, one or more TTIs (i.e., one or more slots or one or more mini slots) may be a minimum time unit of scheduling. Furthermore, the number of slots (the number of mini slots) that compose a minimum time unit of the scheduling may be controlled.

The TTI having the time duration of one ms may be referred to as a general TTI (TTIs according to LTE Rel. 8 to 12), a normal TTI, a long TTI, a general subframe, a normal subframe or a long subframe. A TTI shorter than the general TTI may be referred to as a shortened TTI, a short TTI, a partial or fractional TTI, a shortened subframe, a short subframe, a mini slot or a subslot.

In addition, the long TTI (e.g., the general TTI or the subframe) may be read as a TTI having a time duration exceeding one ms, and the short TTI (e.g., the shortened TTI) may be read as a TTI having a TTI length less than the TTI length of the long TTI and equal to or more than one ms.

Resource Blocks (RBs) are resource block allocation units of the time domain and the frequency domain, and may include one or a plurality of contiguous subcarriers in the frequency domain. Furthermore, the RB may include one or a plurality of symbols in the time domain or may have the length of one slot, one mini slot, one subframe or one TTI. One TTI or one subframe may be each composed of one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may be composed of one or a plurality of Resource Elements (REs). For example, one RE may be a radio resource domain of one subcarrier and one symbol.

In this regard, structures of the above radio frame, subframe, slot, mini slot and symbol are only exemplary structures. For example, configurations such as the number of subframes included in a radio frame, the number of slots per a subframe or a radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by absolute values, may be expressed by relative values with respect to predetermined values or may be expressed by other corresponding information. For example, a radio resource may be indicated by a predetermined index. Furthermore, numerical expressions that use these parameters may be different from those explicitly disclosed in this description.

Names used for parameters in this description are by no means restrictive ones. For example, various channels (the Physical Uplink Control Channel (PUCCH) and the Physical Downlink Control Channel (PDCCH)) and information elements can be identified based on various suitable names. Therefore, various names assigned to these various channels and information elements are by no means restrictive ones.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by a management table. The input and output information and signals can be overwritten, updated or additionally written. The output information and signals may be deleted. The input information and signals may be transmitted to other apparatuses.

Notification of information is not limited to the aspects/embodiment described in this description and may be performed by other methods. For example, the information may be notified by physical layer signaling (e.g., Downlink Control Information (DCI) and Uplink Control Information (UCI)), higher layer signaling (e.g., Radio Resource Control (RRC) signaling, broadcast information (Master Information Blocks (MIB) and System Information Blocks (SIB)), and Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by, for example, an MAC Control Element (MAC CE).

Furthermore, notification of predetermined information (e.g., notification of "being X") may be made not only explicitly but also implicitly (by, for example, not notifying this predetermined information or by notifying another information).

Decision may be performed based on a value (0 or 1) expressed by one bit, may be performed based on a boolean expressed by true or false or may be performed by comparing numerical values (e.g., comparison with a predetermined value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio technique are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station is also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used. The base station is also referred to as a term such as a fixed station, a NodeB, an eNodeB (eNB), an access point, a transmission point, a reception point, a femtocell or a small cell in some cases.

The mobile station is also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above radio base station 10. Furthermore, words such as "uplink" and "downlink" may be read as "sides". For example, the uplink channel may be read as a side channel.

Similarly, the user terminal in this description may be read as the radio base station. In this case, the radio base station 10 may be configured to include the functions of the above user terminal 20.

In this description, specific operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" "calculating", "computing", "processing", "deriving", "investigating", "looking up" (e.g., looking up in a table, a database or another data structure) and "ascertaining". Furthermore, "deciding (determining)" may be regarded to "decide (determine)" "receiving" (e.g., receiving information), "transmitting" (e.g., transmitting information), "input", "output" and "accessing" (e.g., accessing data in a memory). Furthermore, "deciding (determining)" may be regarded to "decide (determine)" "resolving", "selecting", "choosing", "establishing" and "comparing". That is, "deciding (determining)" may be regarded to "decide (determine)" some operation.

The words "connected" and "coupled" used in this description or every modification of these words can mean every direct or indirect connection or coupling between two or more elements, and can include that one or more intermediate elements exist between the two elements "connected" or "coupled" with each other. The elements may be coupled or connected physically, logically or by way of a combination of physical and logical connections. For example, "connection" may be read as "access". It can be understood that, when used in this description, the two elements are "connected" or "coupled" with each other by using one or more electric wires, cables and/or printed electrical connection, and by using electromagnetic energy having wavelengths in radio frequency domains, microwave domains and/or (both of visible and invisible) light domains in some non-restrictive and incomprehensive examples.

When the words "including" and "comprising" and modifications of these words are used in this description or the claims, these words intend to be comprehensive similar to the word "having". Furthermore, the word "or" used in this description or the claims intends not to be an exclusive OR.

The present invention has been described in detail above. However, it is obvious for a person skilled in the art that the present invention is not limited to the embodiment described in this description. The present invention can be carried out as modified and changed aspects without departing from the gist and the scope of the present invention defined by the recitation of the claims. Accordingly, the disclosure of this description intends for exemplary explanation, and does not have any restrictive meaning to the present invention.

The disclosure of Japanese Patent Application No. 2016-215714, filed on Nov. 2, 2016, including the specification, drawings, and abstract, is incorporated herein by reference in its entirety.

The invention claimed is:

1. A terminal comprising:
    a transmitter that carries out an uplink transmission of at least one of an uplink shared channel (physical uplink shared channel (PUSCH)), an uplink control channel (physical uplink control channel (PUCCH)), and a sounding reference signal (SRS); and
    a processor that controls a transmission power used in the uplink transmission based on:
        a value that is calculated based on a number of resource blocks of the uplink transmission and one of a plurality of numerologies having different subcarrier spacings, and
        a transmit power control (TPC) command included in a downlink control information (DCI) format,
    wherein information about the one of the plurality of numerologies is received via higher layer signaling.

2. A radio communication method for a terminal comprising:
    carrying out an uplink transmission of at least one of an uplink shared channel (physical uplink shared channel (PUSCH)), an uplink control channel (physical uplink control channel (PUCCH)), and a sounding reference signal (SRS); and
    controlling a transmission power used in the uplink transmission based on:
        a value that is calculated based on a number of resource blocks of the uplink transmission and one of a plurality of numerologies having different subcarrier spacings, and
        a transmit power control (TPC) command included in a downlink control information (DCI) format,
    wherein information about the one of the plurality of numerologies is received via higher layer signaling.

3. A base station comprising:
    a transmitter that transmits information about one of a plurality of numerologies having different subcarrier spacings to a terminal by higher layer signaling; and
    a receiver that receives from the terminal at least one of an uplink shared channel (physical uplink shared channel (PUSCH)), an uplink control channel (physical uplink control channel (PUCCH)), and a sounding reference signal (SRS) of which transmission power is controlled based on:
        a value that is calculated based on a number of resource blocks of the uplink transmission and the one of a plurality of numerologies, and
        a transmit power control (TPC) command included in a downlink control information (DCI) format.

4. A system comprising a terminal and a base station, wherein
    the terminal comprises:
        a transmitter that carries out an uplink transmission of at least one of an uplink shared channel (physical uplink shared channel (PUSCH)), an uplink control channel (physical uplink control channel (PUCCH)), and a sounding reference signal (SRS); and
        a processor that controls a transmission power used in the uplink transmission based on:
            a value that is calculated based on a number of resource blocks of the uplink transmission and one of a plurality of numerologies having different subcarrier spacings, and
            a transmit power control (TPC) command included in a downlink control information (DCI) format,
        wherein information about the one of the plurality of numerologies is received via higher layer signaling, and
    the base station comprises:
        a transmitter that transmits the information about the one of the plurality of numerologies to the terminal by the higher layer signaling; and
        a receiver that receives from the terminal the at least one of the PUSCH, the PUCCH, and the SRS.

* * * * *